O. W. MOTT.
WHEEL.
APPLICATION FILED OCT. 29, 1920.

1,403,439.

Patented Jan. 10, 1922.

Inventor
Otis W. Mott
By Fay, Oberlin & Fay
Attorneys

UNITED STATES PATENT OFFICE.

OTIS W. MOTT, OF JACKSON, MICHIGAN.

WHEEL.

1,403,439.  Specification of Letters Patent.  Patented Jan. 10, 1922.

Application filed October 29, 1920. Serial No. 420,335.

*To all whom it may concern:*

Be it known that I, OTIS W. MOTT, a citizen of the United States, and a resident of Jackson, county of Jackson, and State of Michigan, have invented a new and useful Improvement in Wheels, of which the follow is a specification, the principle of the invention being herein explained and the best mode in which I have contemplated applying that principle, so as to distinguish it from other inventions.

The present invention relates to fixed rims for vehicle wheels and more particularly to the construction of the same whereby the fixed rim may have spokes of sufficient size readily attached thereto in such a position that the demountable or tire carrying rim may be substantially centrally located with respect to the vertical plane through the centers of the spokes although this construction can be advantageously used with disk or wire wheels.

Further objects are the provision of a fixed rim which will provide a substantially cylindrical seat for the outer edge of the demountable or tire carrying rim, and the locating of such seat within the flat portion of the inner periphery of the rim, so that standard types of tire carrying rims may preferably be used instead of special shapes or constructions.

Another feature of the construction allows the periphery of the outer supporting flange to be maintained within very close limits as the shape of the outer member of the channel allows the metal to flow sufficiently to compensate for variations in original size of stock. This same form of outer member also provides additional stiffness in the fixed rim, allowing lighter stock to be used and at the same time providing strength for the radial thrusts of spokes and wedges or clamps and it also furnishes a bearing support or fulcrum for such clamps. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
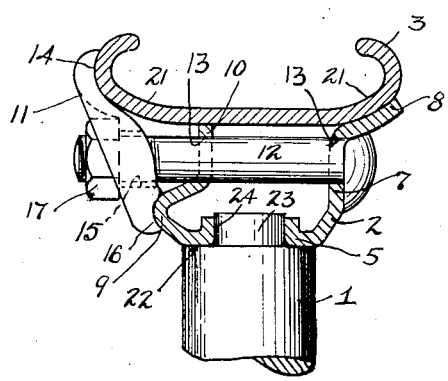
Figure 2:
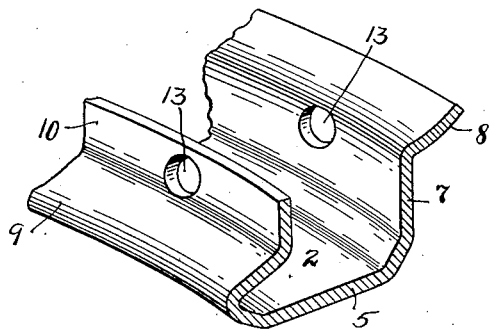

Fig. 1 is a sectional view through a wheel embodying my invention; and Fig. 2 is a perspective view of a portion of the fixed rim.

In the drawings, there is shown a portion of a wheel having spokes 1 which are attached to a fixed rim 2, which supports a demountable or tire carrying rim 3 which may be of any suitable type, but here shown as a clincher type of rim.

This fixed rim is made of a channel section, the base portion 5 having suitable apertures 24 to receive the spokes 1 which are forced through these apertures into position.

Where a wire or disk type of wheel is used, the fixed rim will have the disk or wires comprising the wheel body attached in any suitable manner. The inner annular flange 7 extends upwardly at substantially a right angle to the base portion and is then bent outwardly to form a rim receiving flange 8 which receives the tire carrying rim 3. The outer flange of the fixed rim is formed with a bulging portion 9 adjacent the base portion and then extends upwardly to form an outer flange 10 on the side of the wheel away from the vehicle.

The upper surface of this flange 10 is adapted to present a cylindrical surface to the rim 3 and may be of such diameter as to support rim 3. To hold the rim in place clamping members 11 are employed, which are mounted on bolts 12 extending through suitable apertures 13 in the fixed rim and held in position in such apertures in any suitable manner. The clamping members 11 themselves are provided with an upper rim engaging portion 14 and have an aperture 15 to receive the bolts, the lower ends being provided with a recess 16 adapted to contact or engage with the bulging portion of the fixed rim to form a support for the clamp and also prevent radial movement of the same. Nuts 17 are employed to move the clamping members into engagement with the rim.

The form of fixed rim is important and the use of the bulging portion allows the base of the fixed rim to be made wide enough to receive spokes of any desired size. As each spoke supports the fixed rim upon the flat portion 22 surrounding the reduced portion 23 which fits through the aperture in the fixed rim, the additional width of base portion of the rim allows spokes of large size to be employed, giving large area to the supporting portions 22. Furthermore, by forming the bulge, the upper portion 10 of the supporting flange above the bulge is brought underneath the rim 3 so that it may contact the rim on the flat central surface of the same and not under the curved bead retaining portions 21. In this way the vertical plane through the center of the spokes also includes the center line of the demountable rim 3 making the strongest possible construction.

Furthermore, where the flange 10 is made so as to contact and support the rim, its diameter must be accurate and variations in diameter must be kept within very close limits. This is readily accomplished in the present form as the top of the flange may be rolled or upset in correct relation, the bulge increasing or decreasing slightly to allow for variation in original width of metal employed for the fixed rim. The bulge also increases the strength of the rim allowing light material to be employed without decreasing strength and is particularly adapted to take the thrust from spokes and wedges or clamps as well as forming a support therefor.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A fixed rim of channel form for vehicle wheels comprising a base portion adapted to receive the wheel body, an upstanding flange on the inner side adapted to act as a seat for the tire carrying rim and a flange on the outer side, said latter flange at its upper edge being inset from the outer edge of the base and being connected thereto by a bulging portion of the flange.

2. In a fixed rim of channel form for vehicle wheels, the combination of a base portion adapted to receive the wheel body, an upstanding rim receiving flange on the inner side provided with a curved rim receiving portion and a supporting flange on the other side, the supporting surface of said latter flange being inset from the edge of said base to support the rim under the flat surface of the same, said supporting flange bulging outwardly near the base portion to allow the wheel body to be substantially centrally mounted in said base and centrally of the tire carrying rim.

3. In a fixed rim of channel form for vehicle wheels, the combination of a base portion adapted to receive the spokes of the wheel, an upstanding rim receiving flange on the inner side provided with a curved rim receiving portion and a supporting flange on the other side, the supporting surface of said latter flange being inset from the edge of said base to support the rim under the flat surface of the same, said supporting flange being connected to said base by an outwardly bulging portion adapted to act as a support for clamping means and adapted to allow the base portion to receive the spokes in a plane passing substantially through the center of the tire receiving rim.

4. In a fixed rim of channel form for vehicle wheels, having demountable rims, the combination of a base portion wider than the flat under surface of the demountable rim, an upstanding rim receiving flange on the inner side provided with a curved rim receiving portion, a supporting flange on the other side inserted from the edge of the base to lie under and support the flat surface of the demountable rim, said latter flange being connected to said base by an integral bulging portion, such bulge being adapted to give the necessary width to said base to receive large spokes and at the same time allowing said supporting flange to be inset.

Signed by me, this 20th day of October, 1920.

OTIS W. MOTT.